US005473368A

United States Patent [19]

Hart

[11] Patent Number: 5,473,368

[45] Date of Patent: Dec. 5, 1995

[54] INTERACTIVE SURVEILLANCE DEVICE

[76] Inventor: Frank J. Hart, 2811 Mark Ave., Santa Clara, Calif. 95051

[21] Appl. No.: 216,293

[22] Filed: Mar. 23, 1994

Related U.S. Application Data

[63] Continuation-in-part of Ser. No. 813,089, Dec. 24, 1991, Pat. No. 5,299,971, which is a continuation-in-part of Ser. No. 525,698, May 21, 1990, Pat. No. 5,083,968, which is a continuation-in-part of Ser. No. 277,203, Nov. 29, 1988, Pat. No. 4,930,236.

[51] Int. Cl.[6] .......... H04N 7/18

[52] U.S. Cl. .......... 348/155; 348/169

[58] Field of Search .......... 348/152, 153, 348/154, 155, 169, 151, 164, 163, 143, 214; 340/541, 565, 567; H04N 7/18

[56] References Cited

U.S. PATENT DOCUMENTS

| | | | |
|---|---|---|---|
| 2,700,318 | 1/1955 | Snyder . | |
| 2,961,545 | 11/1960 | Astheimer et al. . | |
| 3,703,718 | 11/1972 | Berman . | |
| 3,760,399 | 9/1973 | Schwarz . | |
| 3,924,130 | 12/1975 | Cohen et al. . | |
| 4,081,830 | 3/1978 | Mick et al. | 348/155 |
| 4,769,545 | 9/1988 | Fraden . | |
| 4,772,875 | 9/1988 | Maddox et al. . | |
| 4,823,051 | 4/1989 | Young . | |
| 4,890,093 | 12/1989 | Allison et al. . | |
| 4,896,039 | 1/1990 | Fraden . | |
| 4,945,367 | 7/1990 | Blackshear | 348/143 |
| 5,243,418 | 9/1993 | Kuno et al. | 348/155 |

*Primary Examiner*—Tommy P. Chin
*Assistant Examiner*—A. Au
*Attorney, Agent, or Firm*—Richard C. Litman

[57] ABSTRACT

An automated interactive surveillance device provides passive infrared surveillance of a predetermined area to determine if an intruder enters the area. When the passive infrared detectors detect such an intruder, the device acts to aim a camera and ultrasonic rangefinder in the appropriate direction. The rangefinder determines the precise distance from the device to the intruder, whereupon the camera is accurately focused, the focal length adjusted for a relatively narrow field of view providing good resolution at the selected distance, and the angular elevation of the camera is adjusted appropriately. The passive infrared detectors may cooperate with a program to determine an approximate size for the detected intruder, based upon the amount of heat detected and the range determined by the ultrasonic rangefinder, to thus determine whether or not a human threat exists. The device may be elevated, with programming considering camera height, range to the intruder, and amount of heat detected to determine the approximate height of the intruder and aim the camera accordingly for a high resolution facial shot. One or more devices as needed may be connected to a remote monitoring site.

13 Claims, 4 Drawing Sheets

INTERACTIVE SURVEILLANCE DEVICE

REFERENCE TO RELATED APPLICATIONS

This application is a continuation in part of U.S. patent application Ser. No. 07/813,089 filed on Dec. 24, 1991 and now U.S. Pat. No. 5,299,971 which was a continuation in part of U.S. patent application Ser. No. 07/525,698 filed on May 21, 1990 and issued as U.S. Pat. No. 5,083,968 on Jan. 28, 1992, which issued patent was a continuation in part of U.S. Pat. application Ser. No. 07/277,203 filed on Nov. 29, 1988 and issued as U.S. Pat. No. 4,930,236 on Jun. 5, 1990.

FIELD OF THE INVENTION

The present invention relates generally to automated electronic security devices, and more specifically to an automated surveillance device using a plurality of passive infrared sensing devices to determine azimuth and an ultrasonic transceiver to determine range and resulting elevation for an elevated camera.

BACKGROUND OF THE INVENTION

The monitoring of areas for various purposes, such as traffic control, animal or human intrusion deterrence, and/or surveillance for security or other purposes, has become increasingly important with population increases and the pressures of a more complex society. Such concerns are often apparent to the observer, who may readily note remote camera installations and security guards and personnel in banks, shopping malls and other areas, as well as pneumatic or other traffic monitoring devices on the road. Such devices and services can be relatively costly, particularly in the case of monitoring or security personnel. However, in some situations there have been no suitable alternatives to such personnel due to the relatively high power demands of many security systems, such as floodlighting for camera surveillance, etc., as well as the need for human observation.

The need arises for a surveillance system which is capable of operating upon demand, i.e., when an intruder or intruders approach the area covered by the system. The system should require relatively low power in normal use, as the additional power required for lights, audio devices, cameras, etc. need only be supplied when required by the primary sensing means. The primary sensing means should be of a passive nature, which renders such sensing means more difficult to detect, as well as further reducing power demands and costs. The system should respond to the needs of surveillance security, by providing a relatively high resolution, narrow field of view video of any intruder in the area, by means of a secondary range determination system providing input to a camera control for elevation and control of the focal length thereof. Moreover, the system should be relatively inexpensive to manufacture and operate in comparison to other systems developed.

DESCRIPTION OF THE PRIOR ART

U.S. Pat. No. 2,700,318 issued to James Snyder on Jan. 25, 1955 discloses a Gun Muzzle Blast Indicator using fixed lenses and progressive density filters. Light from the blast will strike the filters at different points, depending on the direction of the blast relative to the lens orientation. The device determines only direction and is incapable of determining range or elevation, or of interacting with another device (e.g., camera or rangefinder).

U.S. Pat. No. 2,961,545 issued to Robert W. Astheimer et al. on Nov. 22, 1960 discloses a Tracker For Moving Objects directed primarily to the tracking of rockets and/or high speed aircraft having significant heat radiation. The device uses two passive infrared detectors (PIRs), each having a relatively wide field of view, for azimuth and elevation, and two additional PIRs, each having a relatively narrow field of view, for "fine tuning" of the azimuth and elevation of the target. The device is completely passive, and thus is incapable of providing range information.

U.S. Pat. No. 3,703,718 issued to Herbert L. Berman on Nov. 21, 1972 discloses an Infrared Intrusion Detector System using a single PIR detector and a series of mirrors or lenses to broaden the field of coverage of the detector. While the system may be activated by the passage of a heat source across the mirror or lens array, no means is provided to pinpoint either the direction or the distance of the heat source nor to activate any camera or recording means, as a camera could not be aimed by the device with sufficient precision to be useful.

U.S. Pat. No. 3,760,399 issued to Frank Schwarz on Sep. 18, 1973 discloses an Intrusion Detector having a thermopile sensor comprising a plurality of thermocouples. The device depends upon movement of a heat source across the plural thermocouples to create a varying voltage to trigger an alarm. The device is thus incapable of pinpointing a specific direction or azimuth for an intruder, or of determining range, thus rendering the device unsuitable for use with a camera.

U.S. Pat. No. 3,924,130 issued to Allen Cohen et al. on Dec. 2, 1975 discloses a Body Exposure Indicator which may detect infrared radiation from intruders or other sources in the field covered by the device. The device utilizes a mapping system which stores the standard field of view into memory, and a comparator which triggers an alarm when the scanned field does not match the mapped field. Cohen et al. disclose the use of a camera having a relatively narrow field of view, so as to pick out individuals in the scanned field as does the present invention. However, Cohen et al. fail to disclose any means for aiming the camera precisely in the scanned field, nor of determining range or vertical angular elevation to the infrared source in the field in order to focus a camera accurately, as in the present invention.

U.S. Pat. No. 4,769,545 issued to Jacob Fraden on Sep. 6, 1988 discloses a Motion Detector comprising a single PIR detector having a relatively wide angle field of view. Fraden notes that such devices react to changing temperatures, and thus relies upon two intertwined electrodes to detect an infrared source. As the source crosses the electrodes, a temperature difference will be detected and converted to an electrical signal. However, the relatively wide field of view results in essentially the same signal being created at any time an intruder crosses any part of the field of view; the device is incapable of pinpointing the specific azimuth or elevation of an intruder. Accordingly, no camera is provided due to the inability of the device to aim such a camera precisely.

U.S. Pat. No. 4,772,875 issued to James F. Maddox et al. on Sep. 20, 1988 discloses an Intrusion Detection System which includes a plurality of different types of sensors in a horizontal radial array, with additional sensors rotatable relative to the first sensor array. The device is a mobile robot and is incapable of continually scanning a given field due to the need to stop any motion of the robot to confirm whether changes in the status of the sensors are due to motion of an intruder or to motion of the robot. The present invention is permanently installed and affixed to a permanent structure, which eliminates such problems. The Maddox et al. device utilizes radar or "microwave sensors" for range finding to an intruder and a plurality of ultrasonic transducers positioned around the body portion for maneuvering and collision avoidance, although the possible use of a single ultrasonic device for the determination of range to an intruder is also noted. As the mobile Maddox et al. robot may only be used on a smooth, relatively level surface, no means is provided for the determination of differential elevation (if any) to an intruder, as provided for by the present invention. While provision is made to activate a camera when an intruder is sensed, no means is provided for adjusting the focal length of the camera depending upon range to the intruder, nor for adjusting the angular elevation of the camera, as it is assumed that the intruder is on the same flat, essentially level surface as the robot. The present invention provides for camera focal length adjustment as well as azimuth adjustment, and further recognizes that differences in elevation between the installation and an intruder due to installation and/or terrain, result in a need to adjust the elevation of the camera for an accurate, relatively high resolution picture. Moreover, Maddox does not store a record of range information produced by the ultrasonic devices, as the Maddox robot is intended to be moving and thus any distances to other objects and ultrasonic reflections will always be changing. The present surveillance device is stationary, and accordingly "maps" of ultrasonic reflected distances are recorded and stored for comparison with those produced when the device is activated.

U.S. Pat. No. 4,823,051 issued to William A. Young on Apr. 18, 1989 discloses an Infrared Actuated Control Switch Assembly providing for the operation of an overhead light in a room. Two 360 degree conical viewing fields are provided for the detection of persons entering and remaining in a room. The passive infrared detectors of the present invention subtend a sufficiently broad vertical angle as to cover the required elevation range without need for two vertically spaced apart units or lenses. Moreover, the Young device seeks only to turn a light on or off, and thus no additional aiming apparatus or circuitry is needed, as in the present invention. As the Young device does not sense the specific direction of the heat source, it cannot provide for the aiming of a camera, as in the present invention.

U.S. Pat. No. 4,890,093 issued to James R. Allison et al. on Dec. 26, 1989 discloses a Solar Powered Proximity Triggered Light. No means is disclosed for the determination of a specific direction, distance or elevation of an intruder from the detector, and thus no camera is provided, as it would be impossible to aim such a camera properly without information pinpointing the location of the intruder.

Finally, U.S. Pat. No. 4,896,039 issued to Jacob Fraden on Jan. 23, 1990 discloses an Active Infrared Motion Detector And Method For Detecting Movement. As indicated by the Fraden '039 patent title, the device transmits an infrared signal at a temperature above ambient (i.e., shorter wavelength or higher frequency) and detects any reflected radiation in the transmitted wavelength. The infrared transmittal, and the additional energy required and possibility of detection by an intruder, are problems obviated by the passive nature of the present invention. Moreover, while means for intruder detection is disclosed, no means is provided for pinpointing the precise direction or azimuth of the intruder, nor the vertical elevation and range. Accordingly, no camera is disclosed, as the accurate aiming of such a camera is impossible without the ability to locate the intruder precisely.

None of the above noted patents, taken either singly or in combination, are seen to disclose the specific arrangement of concepts disclosed by the present invention.

SUMMARY OF THE INVENTION

By the present invention, an improved interactive surveillance device is disclosed.

Accordingly, one of the objects of the present invention is to provide an improved interactive surveillance device which may be used for a variety of purposes, such as surveillance of intruders and/or tracking an intruder with a camera and/or light.

Another of the objects of the present invention is to provide an improved interactive surveillance device which utilizes a purely passive means of surveying the scanned area, and which activates an active transceiver to determine the range of an intruder precisely when an intruder is passively detected.

Yet another of the objects of the present invention is to provide an improved interactive surveillance device which controls a camera, and provides for the precise control of azimuth, angular elevation, and focal length of the camera to provide a relatively high resolution picture of an intruder.

Still another of the objects of the present invention is to provide an improved interactive surveillance device which does not require the intervention of a human operator.

An additional object of the present invention is to provide an improved interactive surveillance device which includes a passive determination of the approximate size of an intruder, by means of the range determined by the transceiver, energy received by the passive devices, and appropriate microprocessor and/or computer programming.

A further object of the present invention is to provide an improved interactive surveillance device which utilizes passive infrared detectors for continuous is surveillance of the subject area, and an ultrasonic transceiver for active determination of range, with the ultrasonic device remaining inactive until activated by the detection of an intruder by the passive infrared detectors.

An additional object of the present invention is to provide an improved interactive surveillance device which is capable of scanning a field of at least 180 degrees of azimuth, and further precisely aiming a camera at an intruder within that field.

Yet another object of the present invention is to provide an improved interactive surveillance device which is capable of operating in darkness and/or relatively low light conditions, by means of auxiliary lighting actuated by the device and/or an infrared or low light camera.

Still another object of the present invention is to provide an improved interactive surveillance device which requires relatively little electrical power until activated by an intruder, due to the passive nature of the primary surveillance means.

A final object of the present invention is to provide an improved interactive surveillance device for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
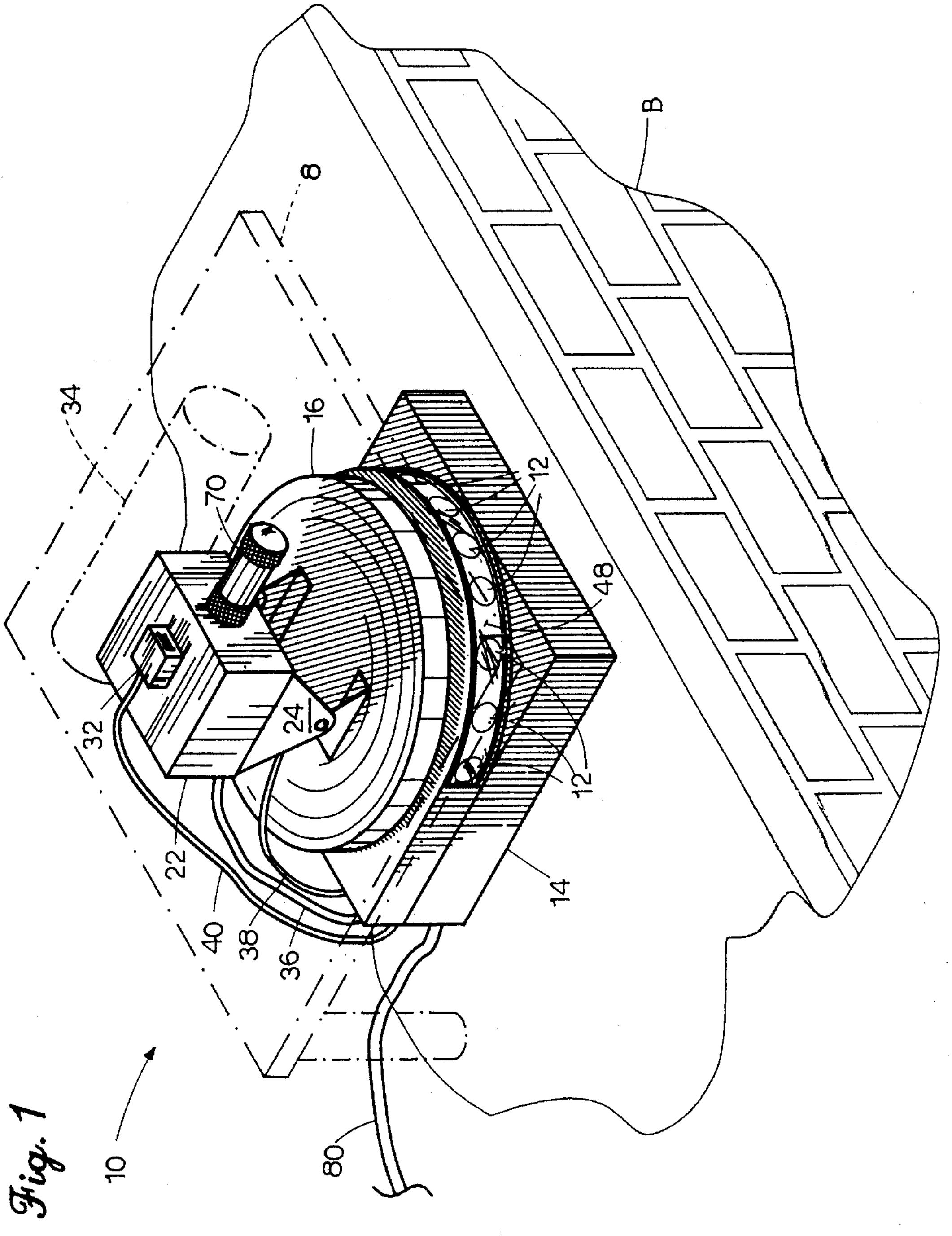
FIG. 1 is a perspective view of the present invention showing its various major components.

Referring now particularly to FIG. 1 of the drawings, the present invention will be seen to relate to an automated interactive surveillance device 10, providing for the remote, automated surveillance of an area, e.g., automated bank teller machines, high security parking areas, unattended property, storage areas, and other areas which may be subject to vandalism or damage, etc. The primary sensing means of the present surveillance device 10 is an array of passive infrared detectors 12, hereinafter generally called. "PIRs" throughout the present specification. The PIRs 12 are passive, in that they only receive energy, and do not transmit energy as an active device would which relies upon the reception of reflected energy from its own transmission (e.g., radar). Thus, the present surveillance device 10 cannot be detected by other devices which may receive transmitted energy, until the present device 10 has already been activated by an intruder as discussed further below. The passive nature of the present interactive surveillance device 10 also results in relatively low energy consumption until activated, as well as lower costs due to the lack of infrared transmission means required.

The array of plural PIRs 12 is installed in a stationary base portion 14 which may be permanently installed and immovably affixed to a stationary supporting structure, e. g., the building B of FIG. 1. A weather shelter 8 or the like may be installed over the device 10 as desired, to provide some protection from the elements. While most of the components of the device 10 may be completely enclosed as they rely upon purely passive reception of energy and do not transmit, an ultrasonic rangefinder transceiver (described further below) is provided, and at least the transmitting antenna or orifice must be exposed. (Alternatively, other transceiver types may be used, e.g., microwave, etc.) The stationary base portion 14 serves as a base for a rotatable portion 16 disposed thereabove, as well as serving as a housing for other components of the device 10 described further below.

Figure 2:
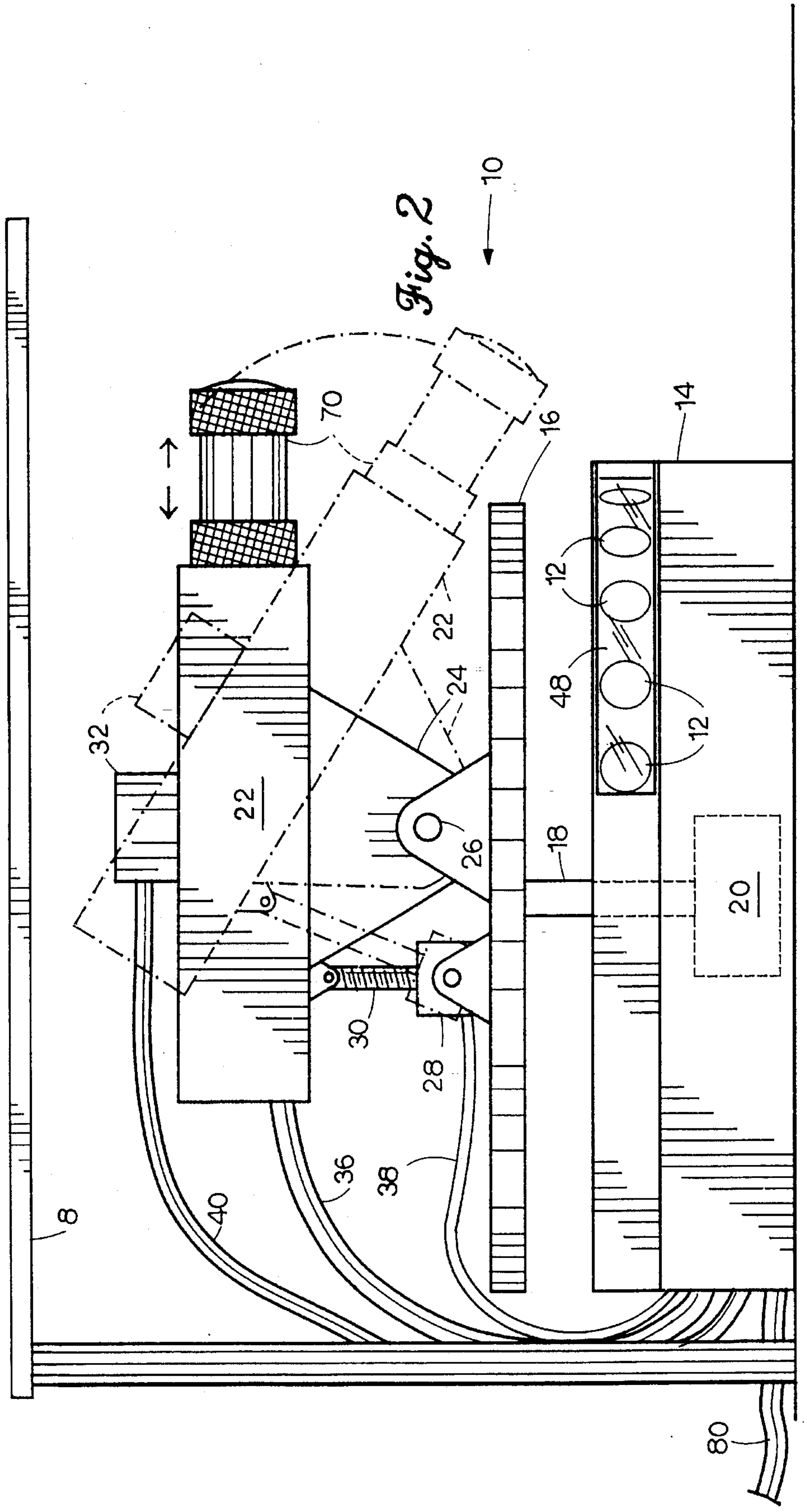
FIG. 2 is a side elevation view showing the camera tilt mechanism and other features.

The rotatable portion 16 is mounted on a substantially vertical rotary shaft 18 driven by a stepper motor 20 housed within the stationary base portion 14 (FIG. 2). A camera 22 (e. video camera, infrared camera or camera adapted to low light levels, or other camera as required) is mounted atop the rotary platform 16 by means of an arcuately pivotable camera mount 24 having a substantially horizontal pivot axis 26, thus enabling the camera 22 to travel in a vertical arc to adjust its angular elevation. The adjustment of the arcuate elevation of the camera 22 is provided by a pivotally mounted camera adjustment motor 28 (FIG. 2), which may drive a jack screw 30 or other means adapted to provide for the tilt or angular elevation adjustment of the camera 22.

An ultrasonic rangefinder 32 is also affixed to the rotatable platform 16, preferably attached to the camera 22 so as to be automatically aimed in the same direction as the camera 22 at all times. Optionally, a light 34 may be installed atop the rotary platform 16, preferably also affixed to the camera 22 and permanently aimed in the same direction as the camera lens. The camera 22, camera adjustment motor 28, and rangefinder 32 may communicate with the electronic circuitry housed within the stationary base portion 14 respectively by means of cables 36, 38, and 40. (Light 34, if so equipped, is also connected to the base portion by a power cable, not shown.)

Figure 3:
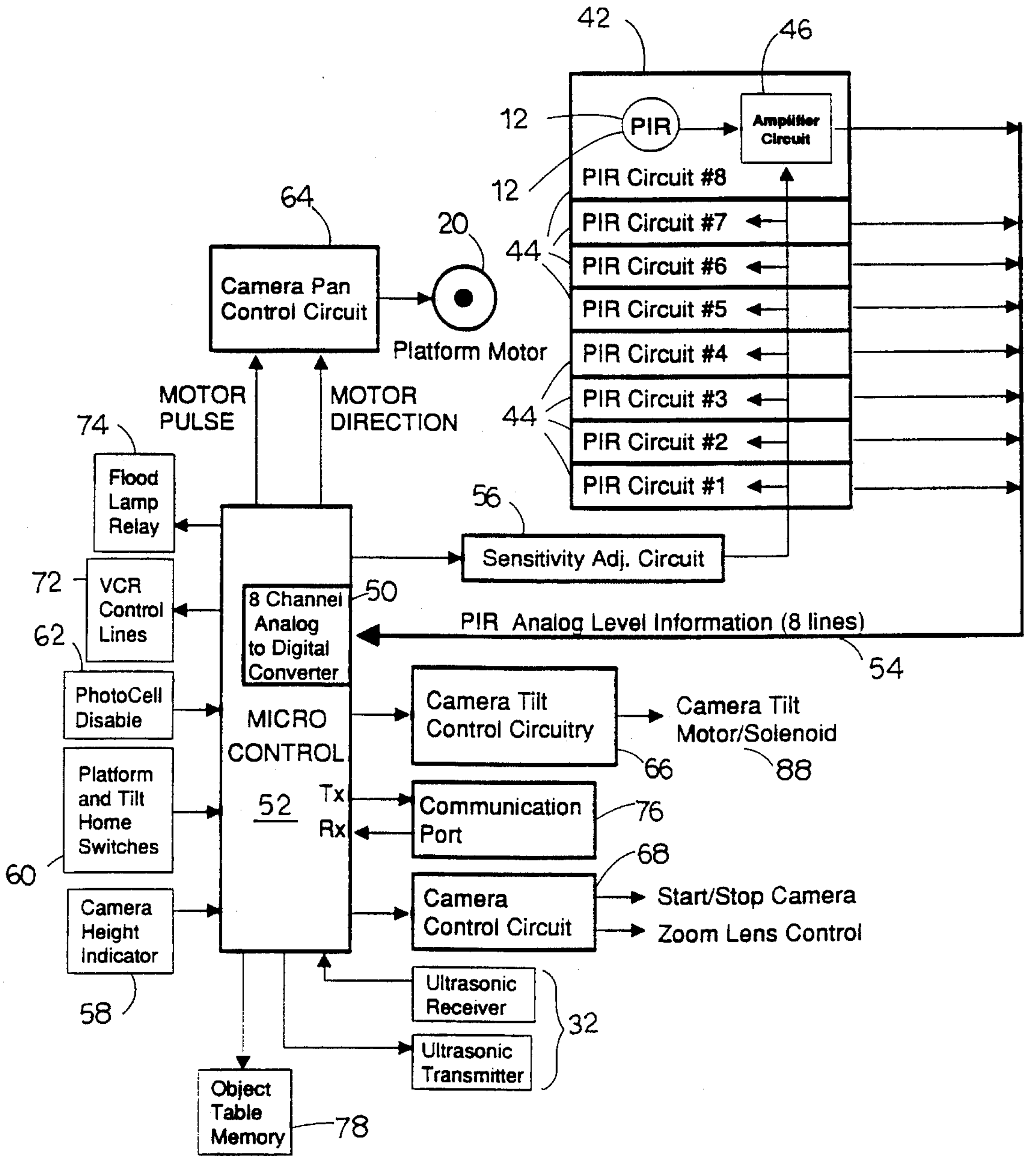
FIG. 3 is a block diagram of the circuitry used in the present invention.

FIG. 3 provides a disclosure of the electronic circuitry contained within the stationary base portion 14 and providing for the operation of the present automated interactive surveillance device 10. In FIG. 3, eight different PIR circuits (for eight different PIRs), comprising a PIR circuit block 42, are disclosed. As noted above, the entire field scanned by the PIR array subtends 180 degrees horizontally; thus, each PIR of an array of eight PIRs will subtend a substantially equal horizontal field of 22.5 degrees. The PIRs are installed within the stationary base portion 14 of the device, behind a fresnel lens 48 (FIGS. 1 and 2) which provides a total of 180 degrees of coverage, and which serves to segregate the individual fields of view of each of the PIRs 12 by means of barriers (not shown, but disclosed in an earlier application by the present applicant). (The present surveillance device may be operable with as few as four PIRs, but directional sensitivity, and the resulting ability of the device to aim and adjust the focal length of a camera, will be somewhat less than with a greater number of PIRs each subtending a narrower field of view.) Each of the PIRs (such as the PIR 12 shown at the top of the PIR circuit block 42) communicates with a PIR circuit 44, each of which provides a signal to an amplifier circuit 46 (one of which is shown in PIR circuit no. 8 of the PIR circuit block 42).

The signals from each of the PIRs 12 are supplied to an analog-to-digital (A/D) converter 50, which may be physically located with the microcontroller 52 of the device. (It will be understood that, as each of the PIR signals must be separated from every other PIR signal in order for the microcontroller 52 to determine which PIR(s) is/are being triggered, that the cable 54 from the PIR circuits to the A/D converter actually comprises a sufficient number of independent lines to provide separate signals from each PIR to a dedicated channel of the A/D converter. As an example, the eight PIR array shown in the drawing figures of the present surveillance device 10 provides signals to an eight channel A/D converter through eight separate lines between each of the PIRs and a corresponding A/D converter channel.) The microcontroller 52 in turn provides a signal to a sensitivity adjustment circuit 56, which circuit 56 provides adjustment to the PIRs 12 to preclude their being triggered or activated due to relatively small heat sources toward the range limits of the device 10.

Other input to the microcontroller 12 includes a camera height indicator 58 comprising a plurality of switches, e.g., four switches in a four bit hexadecimal array. Thus, height indicator 58 could represent 16 different settings for heights from 0 to 15 feet in one foot increments (or 0 to 7.5 feet in six inch increments, etc.). The microprocessor 52 reads the switch setting of the height indicator 58 and uses the height information to initialize a central tilt angle approximating aim at a target in the mid-range distance. This height information is also used in combination with range information provided by the transceiver 32, to determine the angle of tilt of the camera 22 to aim at a target within the field being surveyed, according to a trigonometric algorithm discussed below. Input to the microprocessor 52 is also provided by limit or "home" switches 60 for the platform stepper motor 20 and the camera tilt adjustment motor 28, which preclude motor operation past predetermined arcuate limits and reposition the camera and platform to a central position after actuation, and a photocell input 62 serving to disable the light 34 during daylight or relatively bright conditions. The microcontroller 52 also receives input from the receiver of the ultrasonic transceiver 32, after the transmitter portion has been activated by the microcontroller; the specific operation is described further below.

Microcontroller 52 is programmed to provide output to control the platform motor 20 to position the rotatable platform 16 as required by means of a panning control circuit 64, and to provide output to a camera tilt control circuit 66 to position the camera 22 relative to the tilt angle. Once the camera 22 has been positioned, the microcontroller 52 will operate the camera by means of the camera control circuit 68, which circuit 68 turns the camera 22 on and off and controls the focal length of the zoom lens 70 (FIGS. 1 and 2) as required. The microcontroller 52 also serves to actuate a video recorder when the camera 22 is actuated, by means of VCR control lines 72, to actuate the flood lamp or light 34 as required according to the signal received from the photocell 62 by means of a flood lamp relay 74, and to provide a signal (video output, alarm, etc.) to a remote monitoring station by means of a communication port 76.

Figure 4:
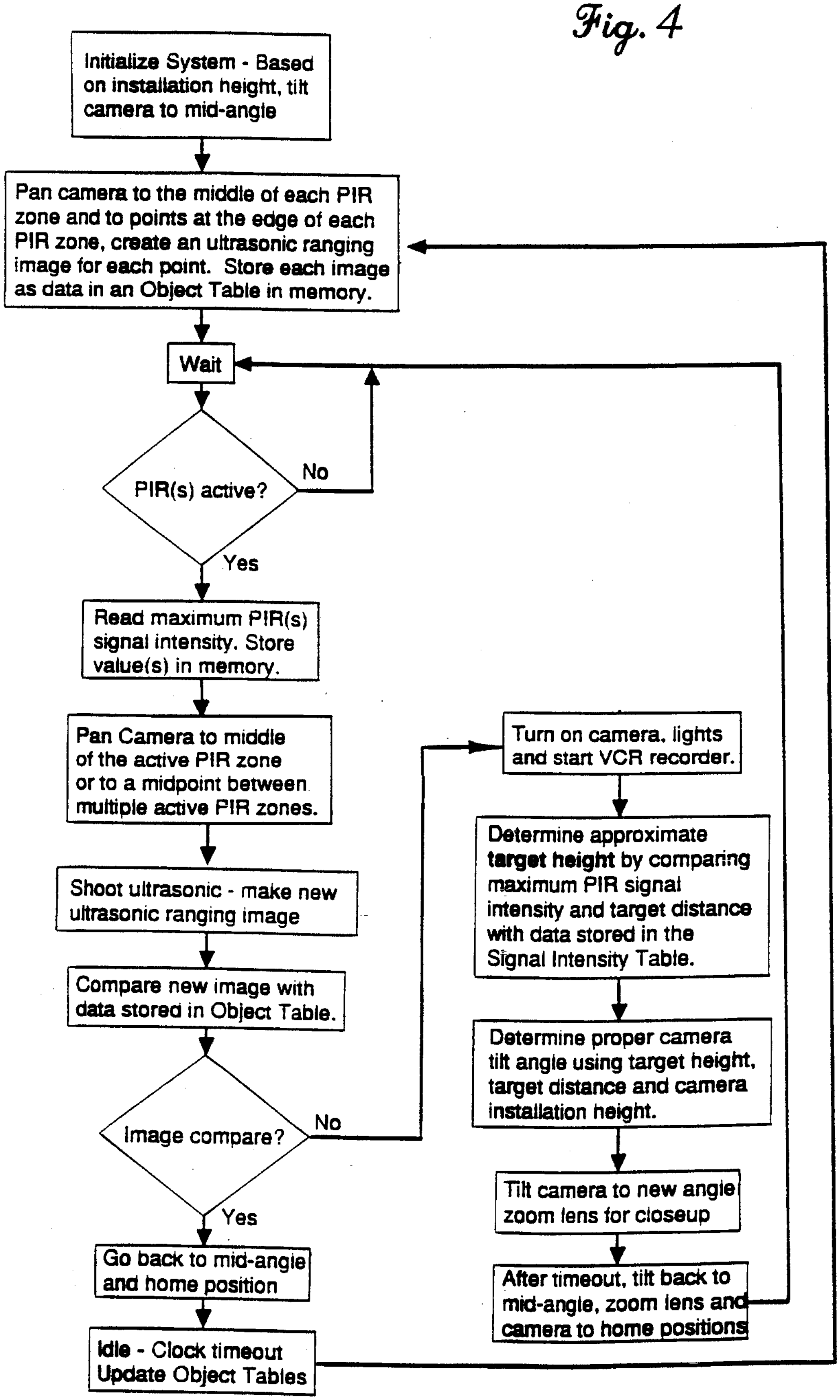
FIG. 4 is a flow chart of the operation of the present invention.

FIG. 4 provides a software flow chart which describes the operation of the present interactive surveillance device 10. When the device 10 is installed, the camera height indicator 58 is initiated to provide the microprocessor 52 with the proper height above the ground or surface. The microprocessor 52 then actuates the platform stepper motor 20 to pan the camera 22, and particularly the ultrasonic transceiver 32 mounted thereon, to each of the zones established by the PIRs 12 of the PIR array in the stationary base portion 14 of the device 10. (The zones need not be limited to the number of PIRs in the array. The microprocessor 52 maybe programmed to recognize a situation in which two adjacent PIRs are detecting a signal and operate the stepper motor 20 to position the camera 22 and ultrasonic transceiver 32 to an intermediate azimuthal position between the two adjacent PIRs. Accordingly, there will be seven intermediate zones interspersed between eight PIRs, or a total of fifteen positions to which the rotatable platform may be turned in the 180 degree semicircular field of azimuth of eight PIRs. Four PIRs will result in a total of seven positions.) The ultrasonic transceiver 32 is then activated at each of the PIR zones (and/or intermediate points), and an "object table" of the distances measured by the ultrasonic device 32 is recorded and stored in the object table memory 78 (FIG. 3). The camera 22 and video recorder are not activated at this time, as the device 10 is merely "surveying" the area to establish a standard background. This step is repeated from time to time, according to the microprocessor programming, when the PIRs are not detecting any significant infrared radiation.

When one (or two adjacent) PIRs 12 receive a higher than normal amount of infrared radiation, its/their output is sent to the microcontroller 52 via the cable 54 and A/D converter 50. The microcontroller 52 then compares the signal intensity received with background, and actuates the camera pan control circuit 64 to cause the stepper motor 20 to turn the rotatable platform 16, and camera 22 and ultrasonic rangefinder or transceiver 32, to align them in the direction of the activated PIR(s). The camera tilt control circuitry 66 is also operated to position the vertical angle of the camera 22 at a midpoint of its arcuate vertical travel (if not already so positioned), as the exact distance of the intruder detected by the PIRs is not yet known. The ultrasonic transceiver 32 is then activated to provide a new ultrasonic "map" of the area, which is compared with the same ultrasonic "map" previously stored in the object table memory 78 and formed during a period of PIR inactivity.

If the two ultrasonic ranges or "maps" show substantial correspondence, and thus no ultrasonic return from an intruder, then the microprocessor 52 treats the PIR activity as a false alarm due to random heating of the environment (e.g., clouds/sunlight, reflections from pavement or another building or window, etc.), and the rotatable platform 16 is returned to a central position for future operation. However, in the event that the new ultrasonic "map" fails to agree substantially with the base "map" data, an intruder is indicated, and the microprocessor 52 will activate the camera 22 (and light 34, depending upon the available light as determined by the photocell 62) and operate the camera tilt motor 28 and adjust the focal length of the zoom lens 70 according to the distance determined by the ultrasonic rangefinder 32 and the height of the camera established by the height indicator 58, to provide a relatively narrow field, high resolution view of the intruder. A video recorder is also activated by means of VCR control lines 72, and a signal may be provided to a remote post via the communication port 76 and communication/power cable 80 (FIGS. 1 and 2).

As an example of the above, let us assume that the lens 70 of the camera 12 is positioned fifteen feet above the surface, measured at the base of the building B to which the present surveillance device 10 is mounted. The platform 16, camera 12, and rangefinder 32 are turned to provide an ultrasonic range to an intruder, and the range is determined to be fifty feet; the face of the intruder is initially assumed to be approximately five feet above the surface. Assuming the ground to be level, it will be seen that the fifty foot distance from rangefinder to intruder comprises the hypotenuse of a right triangle, with the ten foot height of the camera above the face of the intruder forming the adjacent side. The microprocessor 52 may be programmed to calculate the resulting angle of depression or tilt angle for camera 22, by means of relatively simple trigonometric functions, i.e., dividing the height of the camera by the distance established by the rangefinder to establish the cosine of the complementary angle to the angle of depression (cos 10/50=0.200= approx. 78.4 degrees) and subtracting that angle from 90 degrees to arrive at the correct angle of depression of approximately 11.6 degrees. (It will be seen that with further programming of the microcontroller 52, more complex terrain conditions may be taken into account, e.g., a slope toward or away from the building B upon which the present surveillance device 10 is mounted, or conditions of uneven terrain in different directions from the device 10.)

The above surveillance device 10 and programming therefor may be further refined by comparing the infrared signal intensity received by the activated PIR(s) to the intruder distance measured by the ultrasonic rangefinder 32. A "map" of representative infrared intensities of representative size ranges of people may be programmed into the microprocessor 52, which may be compared with the distance established by the rangefinder 32. If the infrared intensity is greater (or less) than that of a person of standard size, the angle of depression of the camera 22 may be adjusted slightly upwardly (or downwardly) in order to "fine tune" the vertical tilt or aim of the camera to provide a more accurate view of the head and upper body of the intruder.

An intruder thus discovered may be viewed for a predetermined amount of time, or the camera and video operation may continue as long as the ultrasonic rangefinder continues to report an intruder in the given direction towards which the rangefinder is pointed and the appropriate PIRs continue to indicate a non-standard infrared signature. When the intrusion threat has ended (by having infrared and ultrasonic indications return to normal, and/or security personnel taking action, etc.), the microprocessor will shut down operation of the ultrasonic transducer, camera, video recorder, and light (if used), and return the platform position and tilt angle of the camera to substantially central positions, where they can be moved relatively rapidly in either direction of travel should another threat arise.

The above described interactive surveillance device 10 will be seen to require no external monitoring, and is completely passive in its operation and transmits no signal or energy until the passive infrared detector(s) is/are triggered. The device is interactive with an intruder, in that as an intruder moves laterally, he/she will trigger other PIRs, which will cause the microprocessor to change the azimuth of the camera (and ultrasonic transreceiver) accordingly to continue to track (and provide a video of) the intruder. The device serves as an extremely cost effective means of monitoring virtually any critical area where it is impractical to position a security guard at all times.

It is to be understood that the present invention is not limited to the sole embodiment described above, but encompasses any and all embodiments within the scope of the following claims.

I claim:

1. An automatically activated and operated interactive surveillance device for the detection and continual surveillance of an intruder, comprising:

a stationary portion having a plurality of passive detectors capable of continually scanning an area and providing for the detection of radiation emission by an intruder, and said stationary portion further including a stepper motor disposed therein and having a substantially vertical shaft extending upward therefrom;

a rotatable platform secured to said shaft of said stepper motor, with said rotatable platform including camera means pivotally mounted thereon to allow arcuate movement in a horizontal plane, and camera tilt means mounted between said rotatable platform and said camera means to control arcuate movement of said camera means in a vertical plane;

said rotatable platform further including active rangefinding means mounted thereon, with said active rangefinding means being aligned with said camera means, and;

control means including circuitry for the determination of the azimuth of the intruder by said passive detectors, operation of said stepper motor to cause said rotatable platform to rotate to align said camera means and said active rangefinding means with the intruder, activation of said active rangefinding means to determine the range from said surveillance device to the intruder, control of said camera tilt means to adjust the vertical elevation of said camera means to aim said camera means at the intruder according to the range determined by said active rangefinding means, and activation of said camera means, whereby;

said interactive surveillance device continually scans a predetermined area by means of said plurality of passive detectors, rotates said rotatable platform to align said active rangefinding means and said camera means with the intruder when the intruder is detected by said passive detectors and activates said active rangefinding means, operates said camera tilt means according to the range determined by said active rangefinding means, and activates said camera means to provide high resolution views of the intruder.

2. The interactive surveillance device of claim 1 wherein:

said interactive surveillance device is adapted to a fixed and immovable installation on a permanent structure.

3. The interactive surveillance device of claim 1 including:

means connecting at least one said interactive surveillance device with a remote security post, and providing communication therewith.

4. The interactive surveillance device of claim 1 wherein:

said camera means includes a lens having adjustable focal length thereof, and said control means includes circuitry providing for the adjustment of said adjustable focal length of said lens according to the range determined by said active rangefinding means, whereby;

said focal length of said lens of said camera means is adjusted to provide an angular field of view according to the range determined by said active rangefinding means, thereby further providing high resolution views of the intruder.

5. The interactive surveillance device of claim 1 wherein:

said control means further includes means for the determination of signal strength provided by said passive detectors and determination of an approximate size of the intruder producing such signal strength, whereby;

said camera tilt means aims said camera means to adapt to the approximate height of the intruder according to said means for the determination of signal strength, thereby further providing high resolution views of the intruder.

6. The interactive surveillance device of claim 1 wherein:

said passive detectors provide continuous surveillance of at least 180 degrees.

7. The interactive surveillance device of claim 1 wherein:

said passive detectors are passive infrared detectors.

8. The interactive surveillance device of claim 7 wherein:

said passive infrared detectors are disposed behind a single fresnel lens with each of said detectors subtending equal azimuthal fields of view, with said equal azimuthal fields of view totaling 180 degrees of azimuth.

9. The interactive surveillance device of claim 1 wherein:

said active rangefinding means comprises an ultrasonic transceiver.

10. The interactive surveillance device of claim 1 wherein:

said camera means comprises a video camera.

11. The interactive surveillance device of claim 1 wherein:

said camera means comprises a camera adapted to receive infrared light, whereby;

said interactive surveillance device is capable of providing views of an intruder in conditions devoid of visible light.

12. The interactive surveillance device of claim 1 including:

light means secured to said rotatable platform and aligned with said camera means, and said control means includes circuitry activating said light means when said camera means is activated, whereby;

said light means provides illumination of an intruder when said camera means is aimed at the intruder and activated.

13. The interactive surveillance device of claim 1 including:

a weather shield disposed over at least said rotatable platform, said camera means, and said active rangefinding means.

* * * * *